United States Patent
Wyskiel

(10) Patent No.: US 9,466,998 B2
(45) Date of Patent: Oct. 11, 2016

(54) EMERGENCY CHARGING AND FAST CHARGING FOR MOBILE ELECTRONIC DEVICES

(71) Applicant: David Wyskiel, Pleasanton, CA (US)

(72) Inventor: David Wyskiel, Pleasanton, CA (US)

( * ) Notice: Subject to any disclaimer, the term of this patent is extended or adjusted under 35 U.S.C. 154(b) by 205 days.

(21) Appl. No.: 13/894,531

(22) Filed: May 15, 2013

(65) Prior Publication Data

US 2014/0159645 A1      Jun. 12, 2014

Related U.S. Application Data

(60) Provisional application No. 61/691,982, filed on Aug. 22, 2012, provisional application No. 61/719,447, filed on Oct. 28, 2012.

(51) Int. Cl.
*H01M 10/46*      (2006.01)
*H02J 7/00*       (2006.01)

(52) U.S. Cl.
CPC ............ *H02J 7/0055* (2013.01); *H02J 7/0042* (2013.01); *H02J 7/0054* (2013.01); *H02J 2007/006* (2013.01); *H02J 2007/0062* (2013.01)

(58) Field of Classification Search
CPC ..... H02J 7/0054; H02J 7/0044; H02J 7/0027
USPC .................... 320/107, 111, 114, 115; 361/66
See application file for complete search history.

(56) References Cited

U.S. PATENT DOCUMENTS

| 5,510,691 | A * | 4/1996 | Palatov | H01M 10/46 320/111 |
|---|---|---|---|---|
| 6,169,384 | B1 * | 1/2001 | Shannon | 320/107 |
| 6,930,409 | B1 * | 8/2005 | Smith | 307/127 |
| 8,575,887 | B1 * | 11/2013 | Pomare | 320/101 |
| 8,579,600 | B2 * | 11/2013 | Vijayakumar | 417/234 |
| 2004/0085694 | A1 * | 5/2004 | Germagian | A45C 13/02 361/90 |
| 2005/0231161 | A1 * | 10/2005 | Jones et al. | 320/114 |
| 2005/0285562 | A1 * | 12/2005 | Wu | H02M 7/003 320/111 |
| 2006/0226805 | A1 * | 10/2006 | Yu | 320/107 |
| 2008/0157712 | A1 * | 7/2008 | Garcia | 320/101 |
| 2010/0102772 | A1 * | 4/2010 | Smith | 320/101 |
| 2012/0212177 | A1 * | 8/2012 | Peacock et al. | 320/107 |
| 2012/0262116 | A1 * | 10/2012 | Ferber | H02J 7/0044 320/111 |
| 2012/0286718 | A1 * | 11/2012 | Richards | 320/103 |
| 2013/0038288 | A1 * | 2/2013 | Yeh | 320/114 |
| 2013/0271081 | A1 * | 10/2013 | Wang | H02J 7/0044 320/111 |
| 2014/0042969 | A1 * | 2/2014 | Miller | H02J 7/0042 320/111 |

* cited by examiner

*Primary Examiner* — Edward Tso
(74) *Attorney, Agent, or Firm* — Useful Arts IP

(57) ABSTRACT

A a charging kit is provided for charging a mobile electronic device from a battery or other DC power source. The charging kit is housed within a portable case and includes multiple cables including an input cable for connecting to the battery or other DC power source and an output cable for connecting to the mobile electronic device. Power conversion circuitry is provided within the housing for converting DC power to a recharging signal for the mobile electronic device.

13 Claims, 5 Drawing Sheets

EMERGENCY CHARGING AND FAST CHARGING FOR MOBILE ELECTRONIC DEVICES

FIELD OF THE INVENTION

Figure 1:
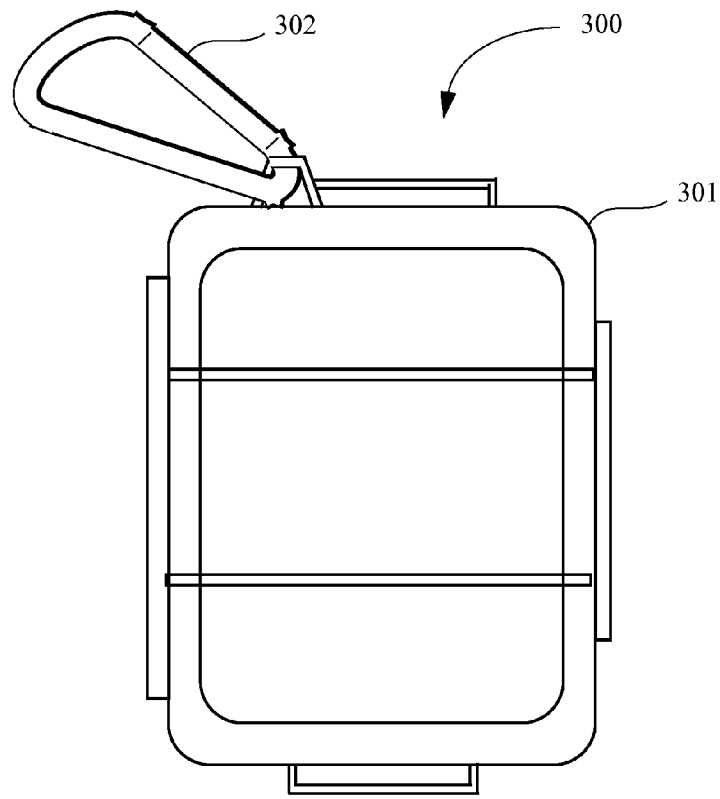

The present invention generally relates to charging of mobile electronic devices.

BACKGROUND OF THE INVENTION

Most people have become highly reliant on cell phones and mobile electronic devices. Great inconvenience can result when a mobile electronic device runs out of charge and becomes inoperable. In emergency situations, the importance of communications, including cellular communications, increases dramatically. Emergency situations are often accompanied by power outages, which may be prolonged. During such power outages, cellular communications networks remain operable for a period of time thanks to back-up power sources. However, recharging mobile electronic devices in such a situation becomes problematic, especially for first responders who may serve long shifts and for whom communications is essential.

Various recharging solutions that do not rely on AC power are commercially available. These solutions are generally of one of the follow types. One type is special purpose battery solutions. A special purpose battery is carried and is coupled to the device to be recharged. Another type is special purpose battery solutions coupled with solar recharging. Small solar panels fold out in order to recharge the special purpose battery. Yet another type is hand-crank generators and the like. Each of these solutions has its own limitations and draw backs.

An additional recharging solution is a car adapter, which allows a device to be recharged from a car battery. Portability, however, is clearly lacking.

BRIEF DESCRIPTION OF THE DRAWING FIGURES

Figure 2:
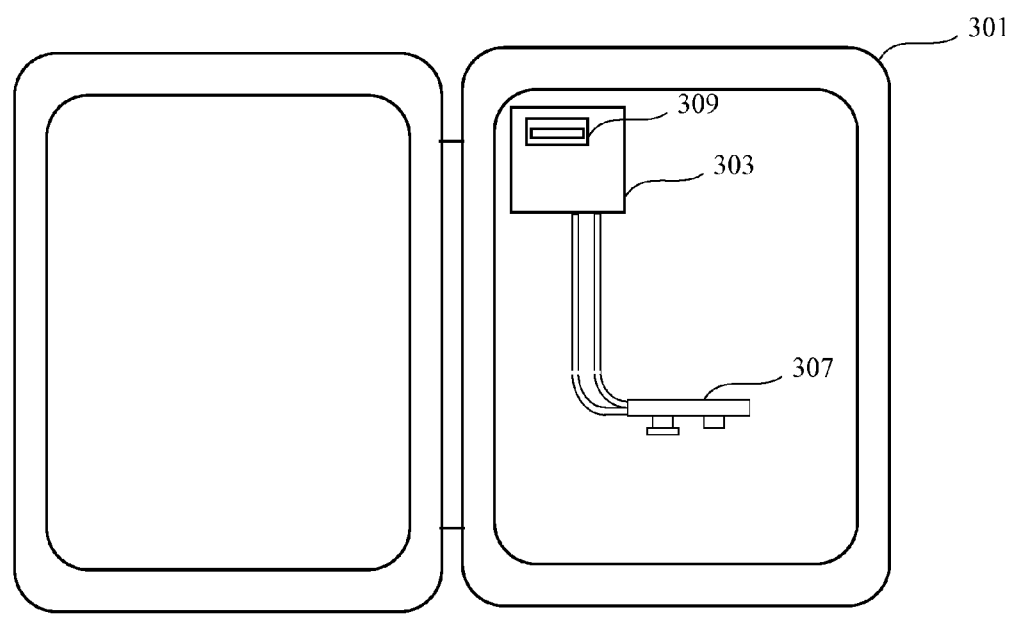
Figure 3:
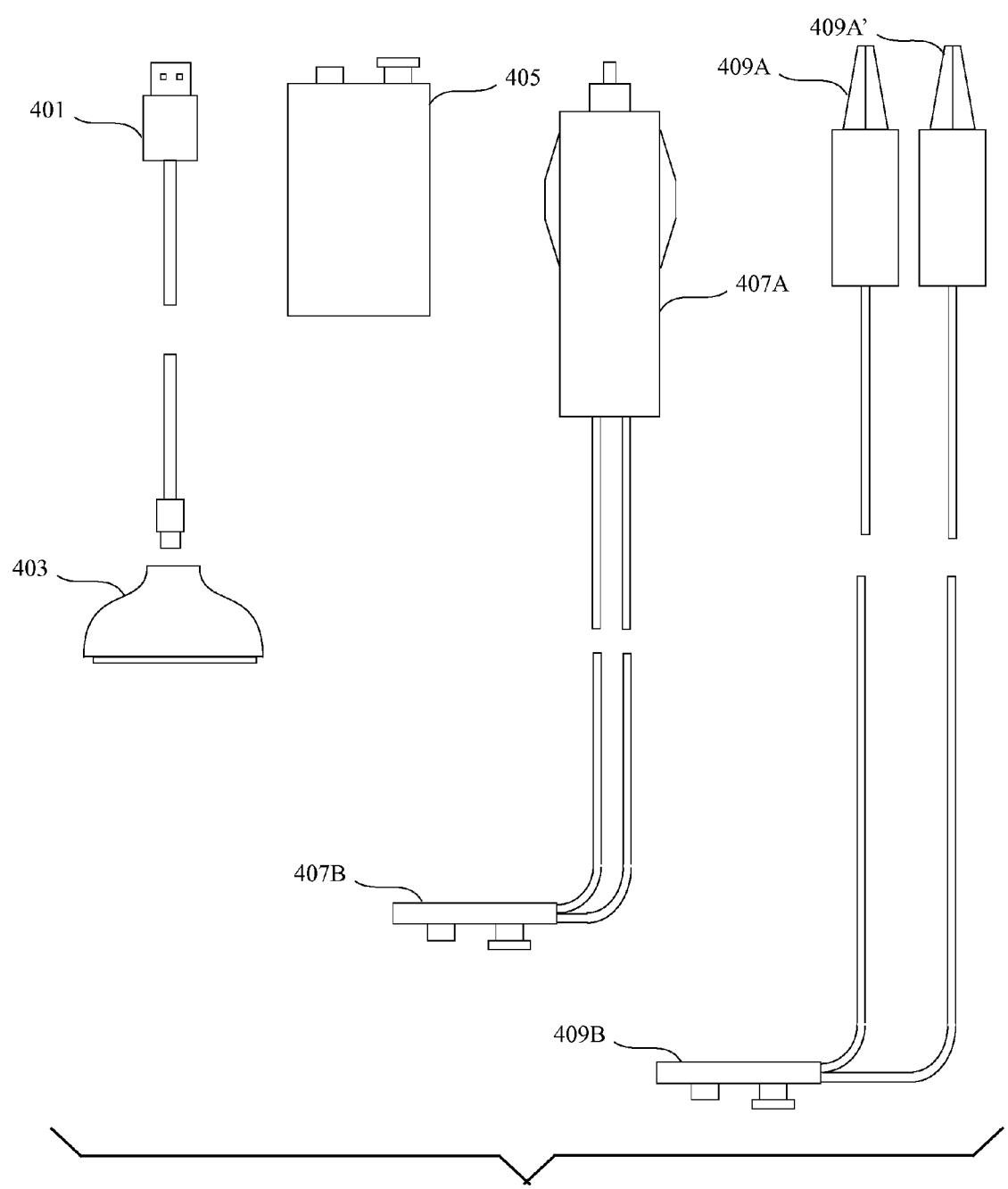
Figure 4:
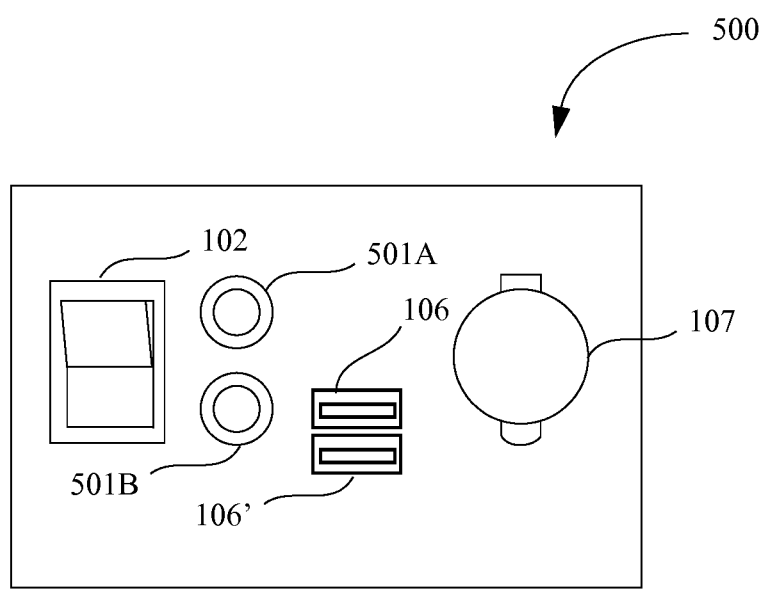
Figure 5:
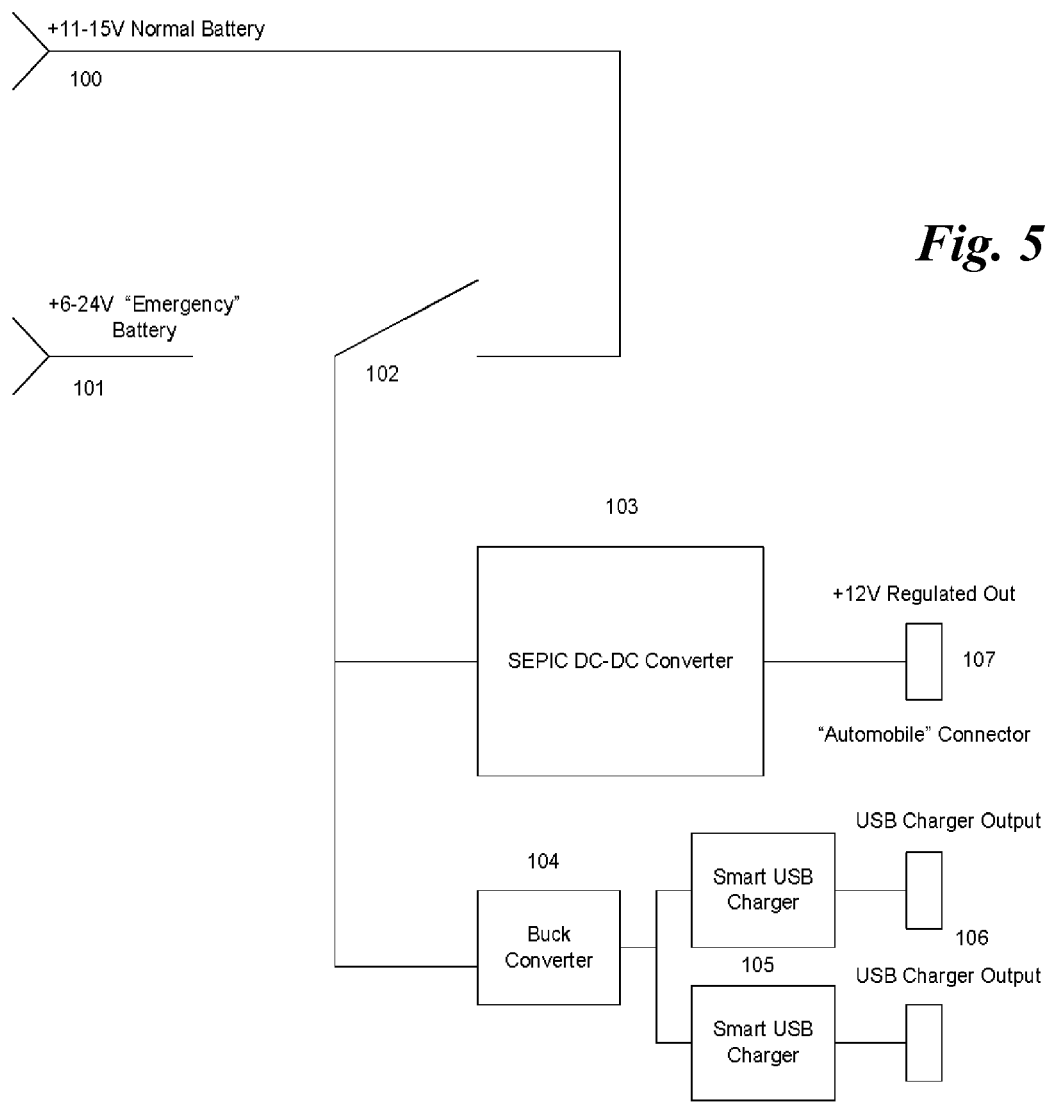
Figure 6:
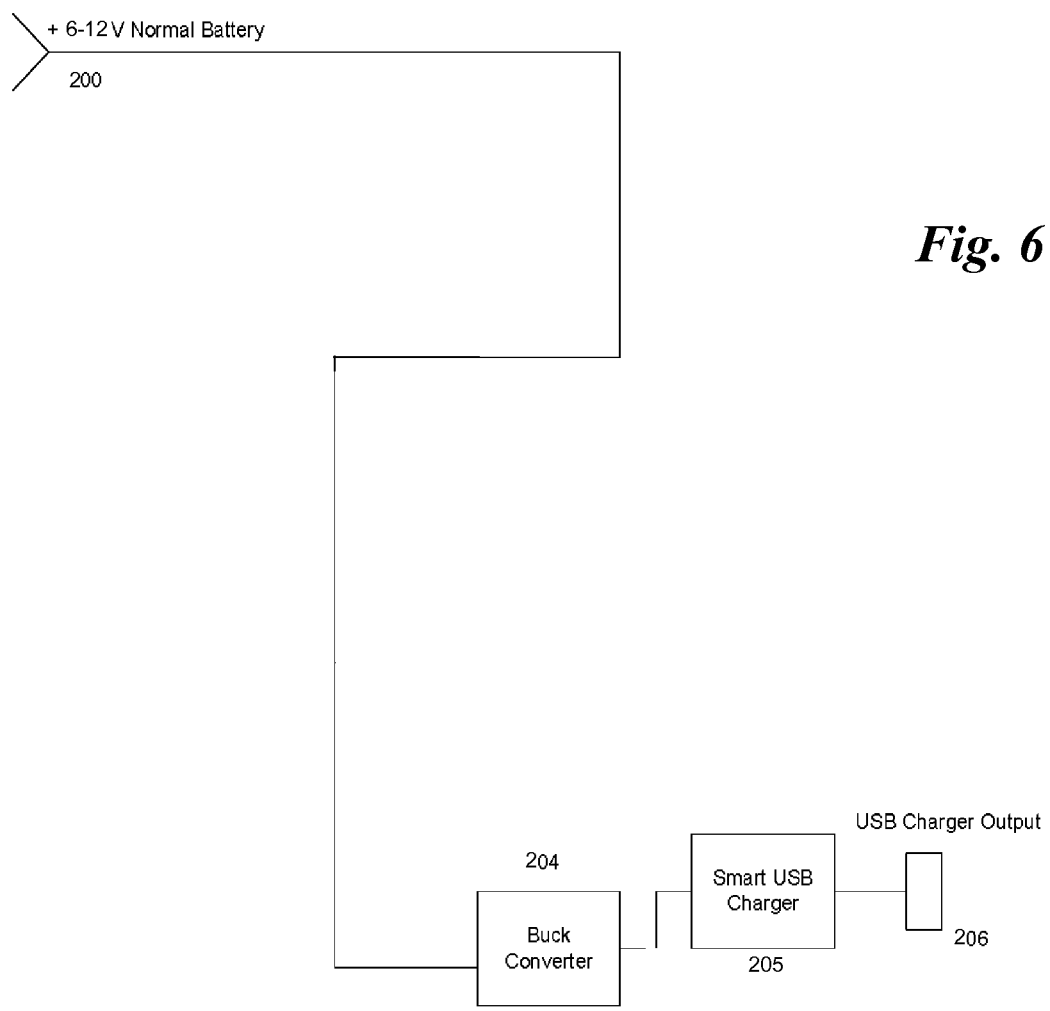

FIG. 1 is a diagram of one embodiment of a charging kit.
FIG. 2 is a diagram of the charging kit of FIG. 1, opened.
FIG. 3 is a diagram of contents of the charging kit of FIG. 1 and FIG. 2 in accordance with an exemplary embodiment.
FIG. 4 is a diagram of a charger in accordance with another embodiment.
FIG. 5 is a block diagram of a power conversion circuit of the charger of FIG. 4.
FIG. 6 is a block diagram of a power conversion circuit of the charging kit of FIG. 1 and FIG. 2.

DETAILED DESCRIPTION

Summary

In one aspect, a charging kit is provided for charging a mobile electronic device from a battery or other DC power source. The charging kit is housed within a portable case and includes multiple cables including an input cable for connecting to the battery or other DC power source and an output cable for connecting to the mobile electronic device. Power conversion circuitry is provided within the housing for converting DC power to a recharging signal for the mobile electronic device.

In another aspect, a charger is provided for charging a mobile electronic device from a battery or other DC power source. The charger is provided within a case, electrical connectors being coupled to the case. In one embodiment, the electrical connectors include a USB connector and a cigarette lighter plug connector. Within the case, power conversion circuitry is provided for converting DC power to a recharging signal for the mobile electronic device, the power conversion circuitry being configured to accept different input voltages within at least a range of six volts to 12 volts. A smart charging feature may be provided to accelerate charging.

In accordance with a further aspect, a method is provided of charging a mobile electronic device using a general purpose battery or other DC power source and a charging kit that includes multiple cables and power conversion circuitry. A cable from the charging kit is used to couple the general purpose battery or other DC power source to the power conversion circuitry, and a cable from the charging kit is used to couple the power conversion circuitry to the mobile electronic device.

Mobile electronic devices may include cell and smart phones, MP3 players, tablets, etc. In the case of a power outage, the charger ensures that mobile devices can be quickly charged, be ready when they are needed, and remain charged until power is restored. Potential users include families, first responders, campers/hikers/boaters, business owners, school administrators, etc.—anyone likely to face the possibility of needing to recharge a cell or smart phone in extreme or stressful conditions. In one embodiment, the charging kit is self-contained in a "grab and go" waterproof, impact-resistant case with simple and concise instructions. The charging kit serves as a valuable addition to an emergency preparedness kit, a wilderness survival kit or as a stand-alone item stocked along side household emergency supplies.

Description

Referring now to FIG. 1, a diagram is shown of a charging kit 300 in accordance with one embodiment. The charging kit 300 is housed in a water resistant case 301. One example of a readily-available case is sold under the trade name Pelican and has approximate dimensions of 3×5×1.5 inches. The case is readily portable and is configured so as to be easily carried on one's person—for example, attached to a belt or belt loop, with or without use of a carabiner such as the carabiner 302. The case 301 may be plastic, metal, or any other convenient material. The inside of the case may be lined with plastic or rubber material to provide cushioning and noise-proofing and to enhance water resistance. The "grab and go" waterproof, impact-resistant case 301 is well-suited for natural disasters, weather emergencies and extreme conditions and is easily stored with emergency kits and responder equipment. In one embodiment, the color of the case is fire-engine yellow, for maximum visibility.

Referring to FIG. 2, the case 301 of FIG. 1 is shown with the case opened. A power conversion circuit 303, which may be encapsulated in hot melt thermoplastic material, is fixed to the inside of the case. One example of a readily-available encapsulant is sold under the trade name Macromelt. In the illustrated embodiment, the power conversion circuit 303 is situated in a corner of the case and is glued to a liner of the case. An input connector is coupled to the power conversion circuit 303 and may take the form of a snap connector 307 of a familiar type commonly used for 9V batteries. An output connector 309 is coupled to the power conversion circuit 303 and may take the form of a USB-A connector. In one embodiment, the power conversion circuit 303 is design to operate with input voltages in the range of 6-12V. In other embodiments, the input voltage range may differ.

The bulk of the interior of the case 300 is available to carry various other component parts of the charging kit. One example of such component parts is shown in FIG. 3. In this example, the component parts include: a USB-A to mini-USB cable 401; a mini-USB to parallel-pin connector adapter 403; a 9V battery 405; a cigarette lighter plug and cable 407A terminated with a snap connector 407B; and a pair of "alligator" clips and wires 409A/409A' terminated with a snap connector 409B. The snap connectors 407B and 409B mate with the snap connector 307 coupled to the power conversion circuit 303. The adapter 403 may be of a type for connecting to an iPhone™ brand phone, for example.

In use, the user connects a battery or other DC power source to the power conversion circuit 303 using one of the supplied cables, and connects the power conversion circuit 303 to the device to be charged, again using the supplied cables/adapters. The battery may be the 9V battery supplied with the charging kit (or a replacement), a car battery, or some other battery or other DC power source such as a lantern battery.

In one embodiment, the power conversion circuit 303 is configured to quickly charge the device requiring charge, in some instances as much as ten times faster than normal. In particular, a smart charging feature charges devices at the maximum rate possible based on device and power source. This fast charging capability is of great advantage in emergency situations.

In another embodiment, an after-market charging unit is provided for vehicular and water craft applications. In the case of water craft in particular, the electrical systems of older water craft do not provide charging capabilities for today's electronic devices. An example of a front panel of such a charging unit 500 is shown in FIG. 4. The charging unit 500 may be housed in a case of metal, plastic, or other suitable material. In one embodiment, the case has approximate dimensions of 6×2×4 inches. The rear of the case (not shown) provides for a hard wired connection to a normal, primary battery, such as the marine battery of a water craft. On a front panel of the charging unit, input connectors 501A, 501B are provided, which may be "banana plug" connectors. The charging unit may be supplied with cables having matching connectors at one end, and at the other end, alligators clips, for example. These cables may be used to connect an emergency battery or other DC power source to the charging unit 500, such as lantern battery as previously described. A switch 102 is used to select between the normal battery and the emergency battery or other DC power source. In the illustrated embodiment, output connectors include two USB-A connectors 106/106' and a cigarette lighter-type, or "automobile" connector 107 (shown covered by a plastic cover).

The charging unit 501 is provided with a power conversion circuit 503, an example of which is shown in FIG. 5. The switch 102 selects between a normal battery input 100 and an emergency battery or other DC power source input 101. The selected input is connected to a DC-DC converter 103 (e.g., a single-ended primary-inductor, or SEPIC, converter) and a buck converter 104. The DC-DC converter 103 produces a +12V regulated output at the automobile connector 107. The buck converter 104 is coupled to a pair of smart USB chargers 105/105', each of which may be integrated circuit-based, for example. The smart USB chargers produce USB charging signals at USB charger outputs 106/106'. One example of a readily-available integrated circuit that may be used for the smart USB chargers 105/105' is available from Texas Instruments under the part number TPS2540A (USB Charging Port Power Switch and Controller). In one embodiment, an integrated charging port identification circuit monitors the USB port for the correct charging rate based on the attached device. The power conversion circuit may be designed to meet Battery Charging Specification BC1.2 for both Dedicated Charging Port (DCP) and Charging Downstream Port (CDP) configurations. In accordance with BC1.2, the integrated circuit may communicate with the device to be charged to determine that maximum rate of charge that the device requests.

An example of the power conversion circuit 303 of the charging kit 300 is shown in FIG. 6. A battery input 200 is connected to a buck converter 204. The buck converter 204 is coupled to a smart USB charger 205. The smart USB charger 205 produces a USB charging signal at a USB charger output 206. The power conversion may also be provided with a switch (not shown) that can be used to limit the maximum current draw. This capability is useful when the power source is weak (as in an old battery) or when the user does not want to charge at the full rate. The user may opt for slower charging, for example, if the battery is overheating, or if the user wants to ensure longer battery life by charging more slowly.

Optional accessories may be provided with the charging unit or charging kit, including for example a foldable solar panel, a battery case, etc. The described charging kit is convenient, flexible and fast. A single package includes all needed cables, batteries and connectors. Any available battery or other DC power source may be used including household, lantern, and car batteries—even the battery in an electronic game or toy. In the case of both the described charging unit and the described charging kit, a smart charging feature enables charging up to 10 times faster than a standard car adapter. For non-portable applications (e.g., vehicular, water craft), the fast charging feature of the described charging unit provides substantial value even in those instances where a conventional cigarette lighter-style plug is already available.

It will be appreciated by those skilled in the art that the present invention can be embodied in other specific forms without departing from the spirit or essential character character thereof. The foregoing description is therefore intended in all respects to be illustrative and not restrictive. The scope of the invention is indicated by the appending claims, not the foregoing description, and all changes which come within the meaning and range of equivalents thereof are intended to be embraced therein.

What is claimed is:

1. A charging kit for charging a mobile electronic device from a DC power source,
   comprising:
   a portable case, configured to be repeatedly opened and closed by hand; and
   within the portable case:
   a plurality of cables including a user-accessible input cable for connecting to the DC power source and an output cable for connecting to the mobile electronic device; and
   power conversion circuitry configured for receiving power through the user-accessible input cable and outputting power through the output cable, for converting battery power to a recharging signal for the mobile electronic device, wherein the power conversion circuitry is configured to convert from an input voltage within an allowable range of input voltages to a specified output voltage wherein the closure mechanism enables the user to exchange for the DC power source a different DC power source.

2. The apparatus of claim 1, wherein the power conversion circuit is configured to accept input voltages within a range of at least six volts to 12 volts.

3. The apparatus of claim 1, wherein the power conversion circuit is configured to output a voltage of five volts.

4. The apparatus of claim 1, wherein the output cable is a USB cable.

5. The apparatus of claim 1, wherein the portable case is water-resistant.

6. The apparatus of claim 1, wherein the power conversion circuitry is encapsulated within a thermoplastic material.

7. The apparatus of claim 1, wherein the power conversion circuit comprises an input connector and an output connector.

8. The apparatus of claim 7, wherein the input connector is a two-terminal snap connector.

9. The apparatus of claim 7, wherein the output connector is a USB connector.

10. The apparatus of claim 1, further comprising an adapter for adapting between a USB connection and a proprietary parallel-pin connection.

11. The apparatus of claim 1, wherein the user-accessible input cable comprises alligator clips.

12. The apparatus of claim 1, wherein the user-accessible input cable comprises a cigarette lighter plug.

13. The apparatus of claim 1, further comprising a clip for attaching the portable case to another object.

\* \* \* \* \*